J. C. DALE.
RAIL BRAKE.
APPLICATION FILED SEPT. 11, 1911.

1,021,507.

Patented Mar. 26, 1912.

UNITED STATES PATENT OFFICE.

JOHN C. DALE, OF MANHATTAN, KANSAS.

RAIL-BRAKE.

1,021,507.  Specification of Letters Patent.  Patented Mar. 26, 1912.

Application filed September 11, 1911. Serial No. 648,612.

*To all whom it may concern:*

Be it known that I, JOHN C. DALE, a citizen of the United States, residing at Manhattan, in the county of Riley and State of Kansas, have invented new and useful Improvements in Rail-Brakes, of which the following is a specification.

Figure 1:
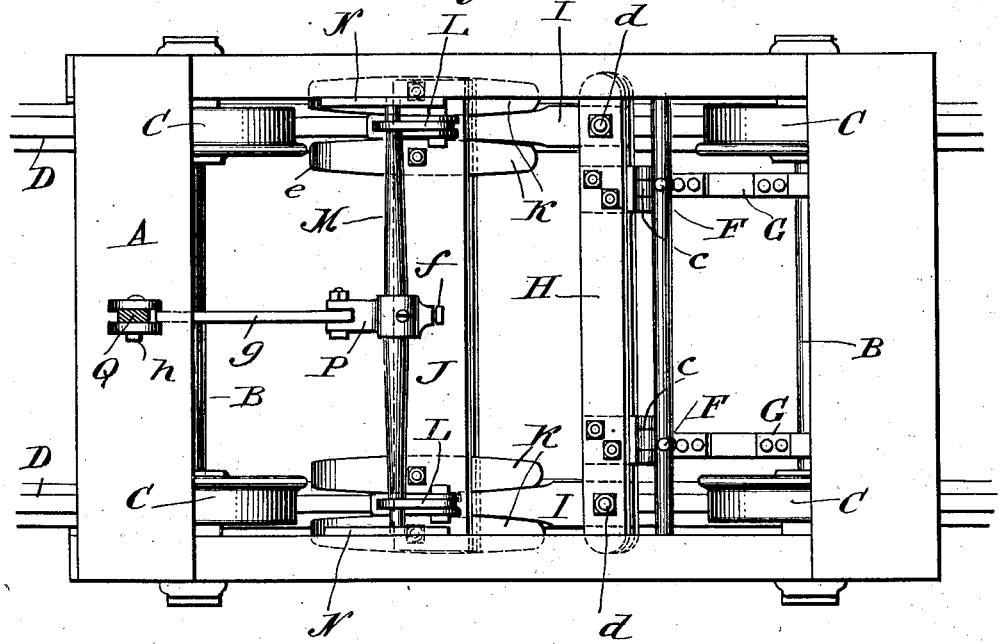
Figure 2:
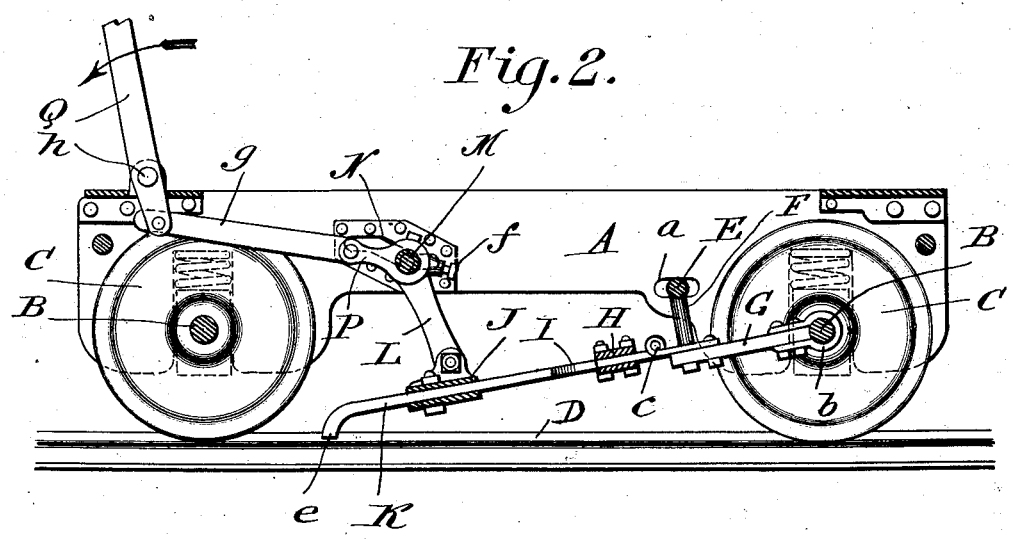

My present invention pertains to car brakes of the rail type; and its novelty, utility and practical advantages will be fully understood from the following description and claims when the same are read in connection with the drawings, accompanying and forming part of this specification, in which:

Figure 1 is a plan of a car truck or frame equipped with my improved brake. Fig. 2 is a longitudinal vertical section taken in a plane at the left hand side of the lever through the medium of which the braking means is raised and is lowered or permitted to swing downward.

Similar letters of reference designate corresponding parts in both views of the drawings.

The truck or frame A is equipped with axles B and wheels C, the latter to bear and travel on rails D, and formed in the sides of said truck or frame are apertures $a$, preferably in the form of slots, that receive the ends of a transverse bar E on which are hangers F. The said hangers F are connected to and support the forward portions of bars G the rear portions of which loosely receive and are supported by the rear axle B, as indicated by $b$.

Hinged at $c$ to the forward ends of the bars G are spaced transverse bars H that are adapted to swing vertically, and pivoted at $d$ between the said bars H are wedges I that extend forwardly therefrom and are disposed above and in the same vertical planes as the rails D, for a purpose hereinafter set forth. Disposed in front of the spaced transverse bars H are spaced transverse bars J, and between said bars J are pivoted rail-engaging clutches K of which two are employed in combination with each wedge I and at opposite sides of the forward portion of the same. At their forward ends said clutches K are provided with depending portions $e$, designed to engage the opposite sides of the heads of the rails D.

The spaced bars J are connected through links L with a transverse, bodily-movable bar M, the end portions of which are disposed in upwardly and forwardly inclined guides N carried by the sides of the truck or frame A. The said bar M is provided with a forwardly extending arm P, fixed thereon by a set screw $f$, and the said arm P is connected through a link $g$ with the lower arm of an upright lever Q that is fulcrumed at $h$ on the truck or frame A and extends upward therefrom.

The links L are loose and adapted to swing forwardly and rearwardly on the bar M. Hence it will be readily understood that when the upper arm of the lever Q is swung forward, as indicated by arrow in Fig. 2, and the bar M and link L are moved rearward and downward to put the end portions $e$ of the clutches K at opposite sides of the rail heads, the links L are enabled to swing rearward to a slight extent. The links L will be caused to so swing rearward by reason of the retardation of the forward movement of the clutches occasioned by their engagement with the rail heads, and in consequence of such retardation and rearward movement of the clutches K with respect to the wedges I, the wedges will press the rear arms of the clutches outward and will bind the forward arms thereof against the rails so as to effect a quick stop no matter how heavy the grade. To release the brake, it is simply necessary for the operator to swing the upper arm of lever Q rearward, whereupon the bar M and link L, together with the bars J, clutches K and wedges I will be drawn upward and the clutches disengaged from the rails.

It will be gathered from the foregoing that my improved rail brake is simple and durable in construction and reliable in operation; also, that the brake is very easy of operation. This latter is due in large measure to the hinging of the bars H at $c$ to the supporting bars G which makes it necessary for the operator to raise only the portion of the mechanism in front of the hinges $c$ in taking off the brake. It will also be noted that the hinging at $c$ materially lessens the liability of the mechanism bending or buckling when the brake is suddenly applied.

Having described my invention, what I claim and desire to secure by Letters-Patent is:

1. In a rail brake, the combination of a frame equipped with an axle and wheels, bars supported at one end on the axle, hangers connected with the frame and the forward portions of said bars, transverse spaced bars hinged to and adapted to be swung up and down on the forward portions of the first-named bars, wedges pivoted between and extending forward from said spaced bars, transverse spaced bars disposed in front of the first-named transverse spaced bars and receiving between them the wedges, rail-engaging clutches pivoted between the second-named transverse bars and disposed at opposite sides of the wedges, upwardly and forwardly inclined guiding means carried by the frame, a transverse bar movable bodily in said guiding means, links connecting said bar and the second-named transverse spaced bars, a lever fulcrumed on the frame, and a connection intermediate the lower arm of said lever and the bodily movable bar.

2. In a rail brake, the combination of a frame equipped with an axle and wheels, supporting means connected with said frame and axle, wedges, vertically swinging means carrying the wedges and hinged to said supporting means, vertically movable means receiving the forward portions of the wedges, clutches pivoted in said vertically movable means and disposed at opposite sides of the wedges, upwardly and forwardly inclined guiding means carried by the frame, a transverse bar movable bodily in said guiding means and connected with said vertically movable means, and means for so moving said transverse bar.

In testimony whereof I have hereunto set my hand in presence of two subscribing witnesses.

JOHN C. DALE.

Witnesses:
 I. J. FROST,
 A. W. WILLIAMSON.

---

Copies of this patent may be obtained for five cents each, by addressing the "Commissioner of Patents, Washington, D. C."